US012655958B1

(12) United States Patent
Chen

(10) Patent No.: US 12,655,958 B1
(45) Date of Patent: Jun. 16, 2026

(54) VEHICLE LAMP ASSEMBLY WITH A PLURALITY OF FRUSTUM REFLECTORS

(71) Applicant: Ford Global Technologies, LLC, Dearborn, MI (US)

(72) Inventor: Linsheng Chen, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 19/215,652

(22) Filed: May 22, 2025

(51) Int. Cl.

| | |
|---|---|
| ***F21S 43/31*** | (2018.01) |
| ***F21S 43/14*** | (2018.01) |
| ***F21S 43/15*** | (2018.01) |
| ***F21S 43/19*** | (2018.01) |
| ***F21S 43/20*** | (2018.01) |
| ***F21S 43/33*** | (2018.01) |
| ***F21S 43/40*** | (2018.01) |
| ***F21Y 115/10*** | (2016.01) |

(52) U.S. Cl.
CPC ............... *F21S 43/31* (2018.01); *F21S 43/14* (2018.01); *F21S 43/15* (2018.01); *F21S 43/19* (2018.01); *F21S 43/2621* (2024.05); *F21S 43/26411* (2024.05); *F21S 43/33* (2018.01); *F21S 43/401* (2024.05); *F21Y 2115/10* (2016.08)

(58) Field of Classification Search
CPC .. F21S 43/31; F21S 43/14; F21S 43/15; F21S 43/19; F21S 43/2621; F21S 43/26411; F21S 43/33; F21S 43/401; F21Y 2115/10; F21V 7/0083
See application file for complete search history.

(56) References Cited

U.S. PATENT DOCUMENTS

| | | | | |
|---|---|---|---|---|
| 4,733,335 | A * | 3/1988 | Serizawa | F21V 29/83 362/547 |
| 5,490,049 | A * | 2/1996 | Montalan | F21S 43/26241 362/240 |
| 8,858,036 | B2 | 10/2014 | Guercio et al. | |
| 9,896,023 | B1 * | 2/2018 | Salter | B60Q 1/525 |
| 10,279,738 | B1 | 5/2019 | Chen et al. | |
| 12,146,633 | B1 | 11/2024 | Chen et al. | |
| 2018/0257551 | A1 * | 9/2018 | Smith | G02B 19/0028 |
| 2023/0150417 | A1 * | 5/2023 | Muegge | F21S 43/15 362/517 |
| 2024/0377040 | A1 * | 11/2024 | Mügge | F21S 43/30 |

FOREIGN PATENT DOCUMENTS

| | | | | |
|---|---|---|---|---|
| CN | 208635006 U | | 3/2019 | |
| CN | 222189598 U | | 12/2024 | |
| JP | 2022053395 A | | 4/2022 | |
| WO | WO-2025051748 A1 | * | 3/2025 | F21V 5/002 |

* cited by examiner

*Primary Examiner* — Erin Kryukova

(74) *Attorney, Agent, or Firm* — Vichit Chea; Carlson, Gaskey & Olds, P.C.

(57) ABSTRACT

A vehicle lamp assembly includes a light source that emits light, a lens of a vehicle lamp, and a reflector assembly having a plurality of frustum reflectors that guide light from the light source to the lens of the vehicle lamp. The frustrum reflectors can be provided within a single reflector assembly.

19 Claims, 3 Drawing Sheets

VEHICLE LAMP ASSEMBLY WITH A PLURALITY OF FRUSTUM REFLECTORS

TECHNICAL FIELD

This disclosure relates generally to a lamp assembly for a vehicle and, more particularly, to a lamp assembly incorporating a plurality of frustum reflectors.

BACKGROUND

Vehicles include various types of lamp assemblies. The lamp assemblies are illuminated when light from a light source moves through a lens. Lamp assemblies can include headlamps, taillamps, side marker lamps, etc.

SUMMARY

In some aspects, the techniques described herein relate to a vehicle lamp assembly, including: a light source that emits light; a lens of a vehicle lamp; and a reflector assembly having a plurality of frustum reflectors that guide light from the light source to the lens of the vehicle lamp.

In some aspects, the techniques described herein relate to a vehicle lamp assembly, wherein the vehicle lamp is a signal lamp.

In some aspects, the techniques described herein relate to a vehicle lamp assembly, wherein the light source includes at least one first light that emits light through a first one of the frustum reflectors within the plurality of frustum reflectors, and at least one second light that emits light through a second one of the frustum reflectors within the plurality of frustum reflectors.

In some aspects, the techniques described herein relate to a vehicle lamp assembly, wherein the lens is an inner lens of the vehicle lamp, and further including an outer lens of the vehicle lamp, the inner lens disposed between the plurality of frustum reflectors and the outer lens.

In some aspects, the techniques described herein relate to a vehicle lamp assembly, wherein the plurality of frustum reflectors are a plurality of first frustum reflectors and the inner lens is a first inner lens, and further including a second plurality of second frustum reflectors and a second inner lens, the plurality of second frustum reflectors guiding light from the light source to the second inner lens, the outer lens spanning over both the first inner lens and the second inner lens.

In some aspects, the techniques described herein relate to a vehicle lamp assembly, wherein the inner lens is grained, and the outer lens is ungrained.

In some aspects, the techniques described herein relate to a vehicle lamp assembly, wherein the light source includes a plurality of light emitting diodes mounted to a circuit board.

In some aspects, the techniques described herein relate to a vehicle lamp assembly, wherein the light source includes the same number of frustum reflectors as light emitting diodes.

In some aspects, the techniques described herein relate to a vehicle lamp assembly, wherein no more than one light emitting diode is associated with each frustum reflector within the plurality of frustum reflectors.

In some aspects, the techniques described herein relate to a vehicle lamp assembly, wherein the plurality of frustum reflectors are a plurality of white frustum reflectors.

In some aspects, the techniques described herein relate to a vehicle lamp assembly, wherein the plurality of frustum reflectors are polymer-based and are molded together.

In some aspects, the techniques described herein relate to a vehicle lamp assembly, wherein the plurality of frustum reflectors are structurally continuous portions of a common body.

In some aspects, the techniques described herein relate to a vehicle lamp assembly, wherein the plurality of frustum reflectors are formed as a single, continuous piece.

In some aspects, the techniques described herein relate to a vehicle lamp assembly, wherein the plurality of frustum reflectors are provided in different regions of a monolithic structure.

In some aspects, the techniques described herein relate to a vehicle lamp assembly, wherein the plurality of frustum reflectors includes a plurality of frustum-shaped reflectors each having a reflective inner surface configured to direct light from the light source toward a respective outlet aperture.

In some aspects, the techniques described herein relate to a vehicle lamp assembly, wherein the vehicle lamp is a vehicle lamp subassembly.

In some aspects, the techniques described herein relate to a vehicle lighting method, including: emitting light from a light source into a plurality of frustum reflectors; and reflecting the light with the plurality of frustum reflectors through an inner lens of a vehicle lamp.

In some aspects, the techniques described herein relate to a vehicle lighting method, wherein the vehicle lamp is a signal lamp.

In some aspects, the techniques described herein relate to a vehicle lighting method, wherein the light source includes at least one first light that emits light through a first one of the frustum reflectors within the plurality of frustum reflectors, and at least one second light that emits light through a second one of the frustum reflectors within the plurality of frustum reflectors.

In some aspects, the techniques described herein relate to a vehicle lighting method, further including emitting the light from the inner lens through an outer lens of the vehicle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

Individual features may be taken independently or in any combination. Features described in connection with one embodiment are applicable to all embodiments unless such features are incompatible.

DETAILED DESCRIPTION

This disclosure relates generally to a lamp assembly having a plurality of individual signal lamps. Each of the signal lamps includes a plurality of frustum reflectors that guide light. Using the plurality of frustum reflectors can, among other things, help to reduce variation in lighting intensity and can facilitate a homogeneous appearance.

Figure 1:
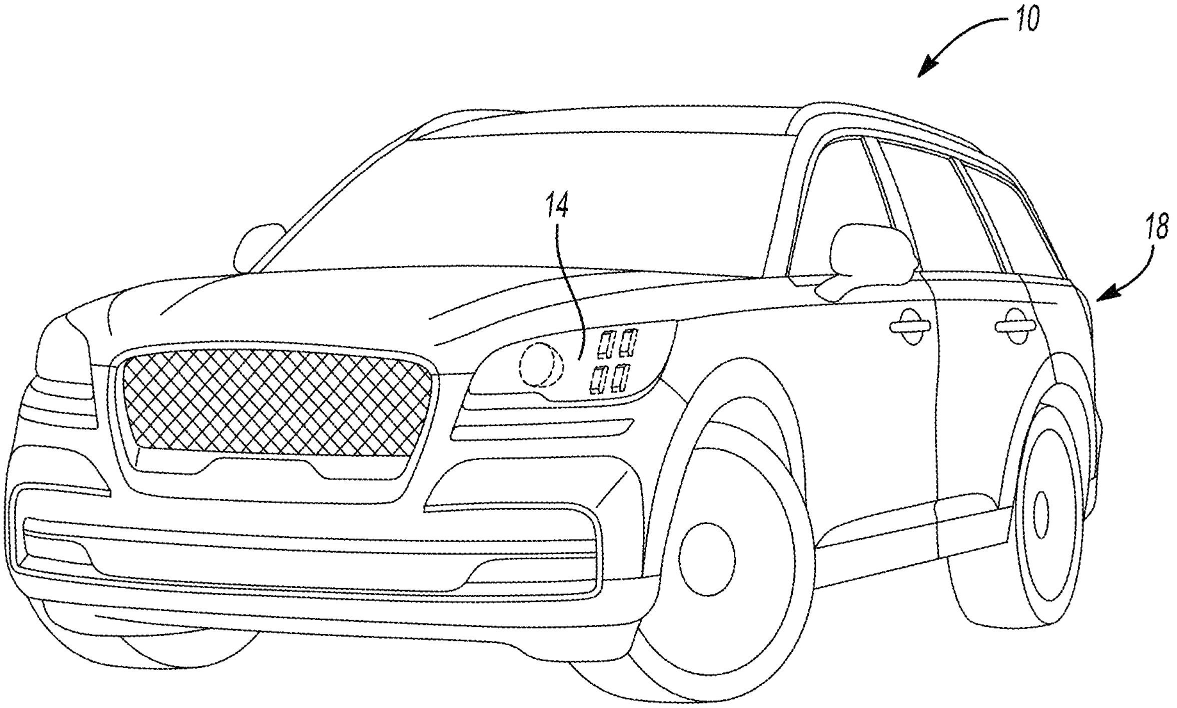
FIG. 1 illustrates a perspective view of vehicle incorporating lamp assemblies.
Figure 2:
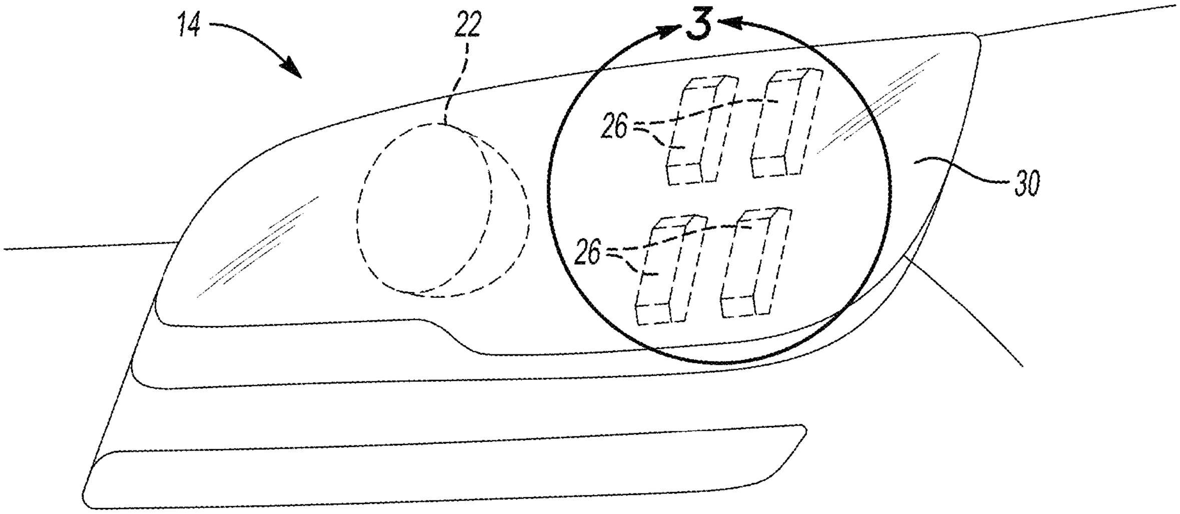
FIG. 2 illustrates a close-up view of a lamp assembly from the vehicle of FIG. 1 according to an exemplary embodiment of the present disclosure.
Figure 3:
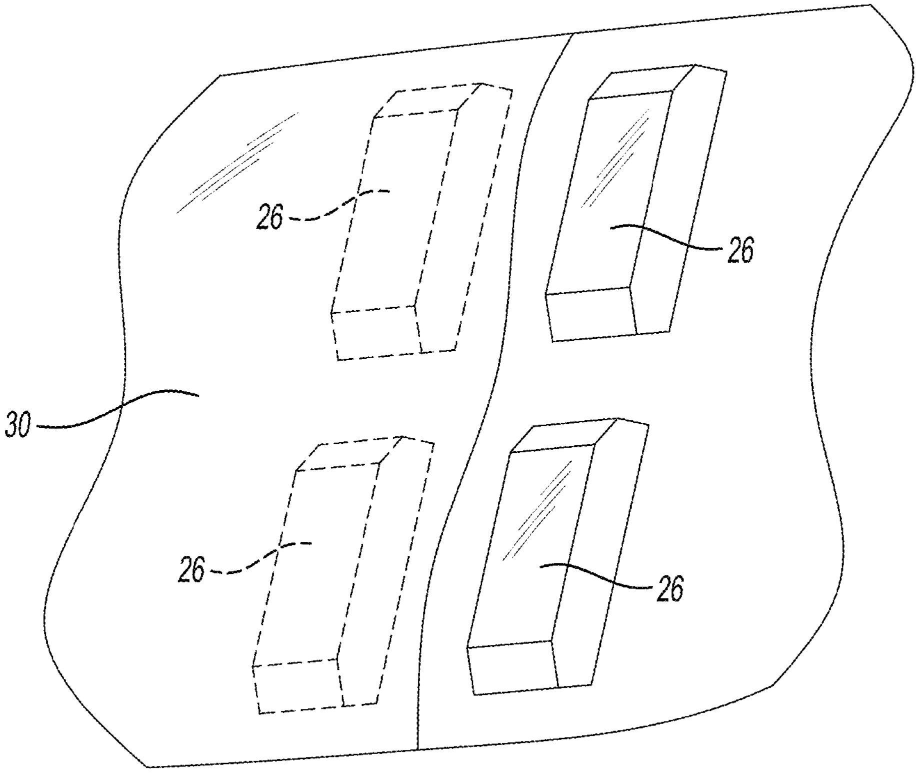
FIG. 3 illustrates a close-up view of signal lamps in the lamp assembly of FIG. 2.

With reference to FIGS. 1-3, a vehicle 10 can include various lamp assemblies including, for example, front lamps 14 and rear lamps 18. The lamp assemblies can each be selectively illuminated by activating a light source.

In the exemplary embodiment, the front lamp 14 on a driver side of the vehicle 10 includes a headlight 22 and a plurality of signal lights 26. The front lamp 14 on the passenger side is structurally and functionally similar to the front lamp 14 on the driver side but is arranged as a mirror image across a longitudinal centerline of the vehicle 10.

Here, the front lamp 14 includes one headlight 22 and four of the signal lights 26. The headlight 22 and the individual signal lights 26 can each be considered a vehicle lamp subassembly.

The headlight 22 can be used to illuminate an area forward of the vehicle 10. The signal lights 26 can be selectively illuminated to provide visual signals. One or more of the signal lights 26 can be activated as turn-signals, hazard signals, daytime running lamps, etc., or simply for aesthetics. The signal lights 26 can be about 50 millimeters wide in some examples. The signal lights 26 can have a vertical height that is from, say, 160 to 200 millimeters.

The front lamp 14 include an outer lens 30 that covers and spans over the headlight 22 and the signal lights 26. The outer lens 30 can be a clear, polymer-based material, such as polycarbonate.

Figure 4:
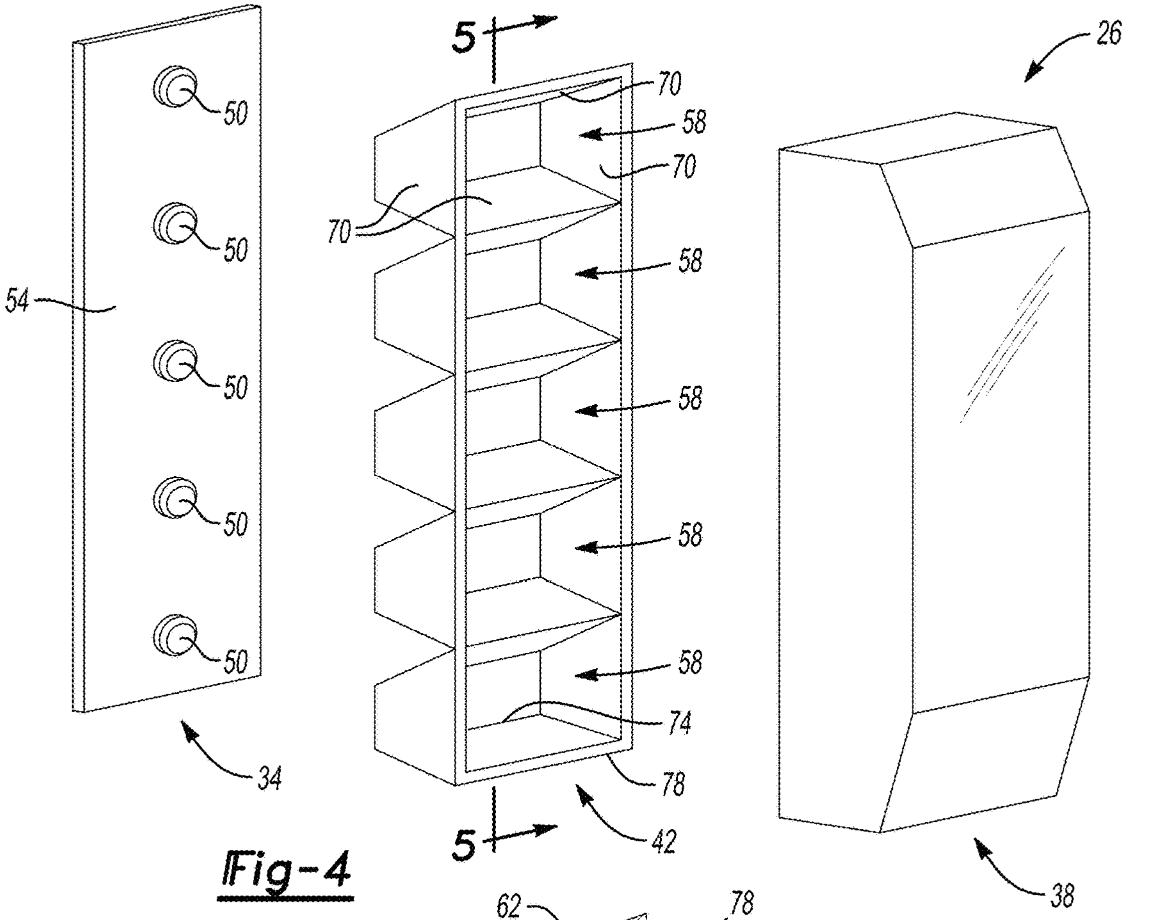
FIG. 4 illustrates an expanded view of one of the signal lamps from FIG. 3
Figure 5:
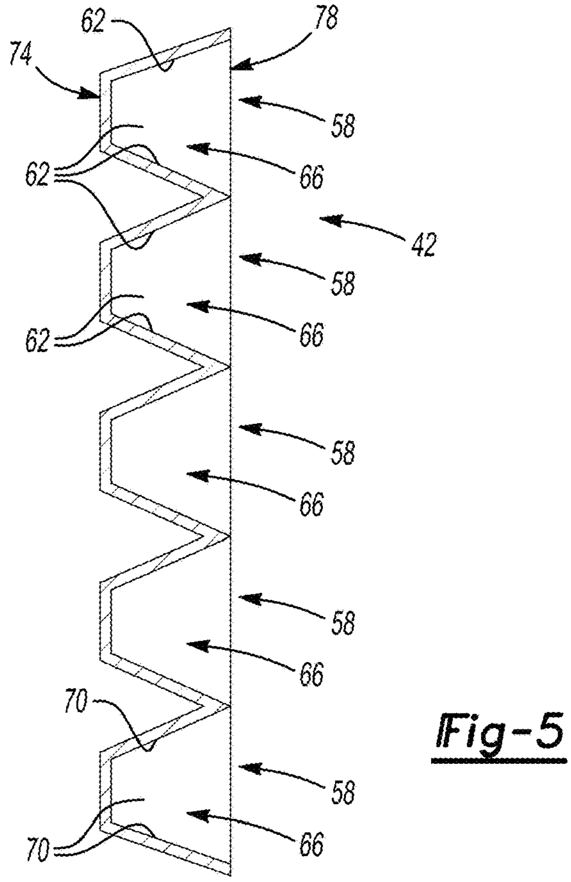
FIG. 5 illustrates a section view taken at line 5-5 in FIG. 4.

With reference now to FIGS. 4-5 and continuing reference to FIGS. 1-3, the signal lights 26 each include a light source 34, an inner lens 38, and a reflector assembly 42 that guides light from the light source 34 to the inner lens 38. The reflector assembly 42 is disposed between the inner lens 38 and the light source 34.

Light that has passed through the inner lens 38 is emitted from the front lamp 18 through the outer lens 30. That is, light from the light source 34 passes through the inner lens 38 and then through the outer lens 30.

The inner lens 38 is grained and the outer lens 30 is ungrained in this example. Graining provides the inner lens 38 with a textured or patterned surface rather than a clear or smooth appearance. Graining of the inner lens 38 can help to more evenly diffuse light emitted from the light source 34. Graining of the inner lens 38 can help to obscure view of the reflector assembly 42 and the light source 34.

To grain the inner lens 38, texturing can be molded into the inner lens 38. The texturing can include fluted areas that are pillow shaped. The curved surfaces of the fluted areas can spread light to different angles. The inner lens 38 can include graining on a side that faces the reflector assembly 42, and opposite side, or on both sides.

The light source 34 for the signal lights 24, in this example, is provided by a plurality of light emitting diodes 50 mounted to a circuit board 54. The light emitting diodes 50 are disposed along a longitudinal axis of the signal lights 24. A person having skill in this art would understand how to activate light emitting diodes 50 such that they emit light.

In the exemplary embodiment, the reflector assembly 42 includes a plurality of frustum reflectors 58 that are contiguous with each other. The plurality of frustum reflectors 58 are structurally continuous portions of a common body and are formed together as a single, unitary structure. The reflector assembly 42 with the plurality of frustum reflectors 58 is formed as a single, continuous piece. The reflector assembly 42 can be a molded, polymer-based material. The reflector assembly 42, or at least some surfaces 62 of the frustum reflectors 58, can be white to facilitate reflectivity. The reflector assembly 42 can be a polycarbonate material.

The example frustum reflectors 58 each have the shape of a truncated, four-sided pyramid. The frustum reflectors 58 each have an interior area 66 established between four walls 70 that taper outward from an inlet opening 74 to an outlet opening 78.

The reflector assembly 42 is arranged so that the inlet openings 74 are each positioned over one or more of the light emitting diodes 50. When the light emitting diodes 50 are activated, light emitted from the light emitting diodes 50 moves through the inlet opening 74 into the respective interior area 66. The light can reflect off of the walls 70 within the interior area 66 before passing through the outlet opening 78 and through the inner lens 38. Because at least some of the light is reflected by frustum reflectors 58, the illumination of the inner lens 38 is relatively homogeneous and concentrations of light are reduced.

Again, portions of the walls 70 that reflect the light can be made white to promote reflection of light reflectivity. The walls 70 could be painted white, molded from a white material, or both. In some examples, the walls 70 could be covered with a highly reflective film.

In this example, one of the light emitting diodes 50 is associated with each of the frustum reflectors 58. In other examples, more than one of the light emitting diodes 50 could be associated with each of the frustum reflectors 58.

Features of the disclosed examples include using a reflector assembly having a plurality of frustum reflectors in a light to meet light intensity objectives while reducing intensity variations in light emitted through a lens—the plurality of frustum reflectors can give reduced an appearance of spottiness in the emitted light. Homogeneity of the light can be improved without the use of complex collimators, light blades, or metalized coatings. A size, depth and angle of the frustum reflectors in the reflector assembly can be modified to adjust performance of the light.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A vehicle lamp assembly, comprising:
a light source that emits light;
a first inner lens of a vehicle lamp;
a second inner lens of the vehicle lamp;
a first reflector assembly having a first plurality of frustum reflectors that guide light from the light source to the first inner lens of the vehicle lamp;
a second reflector assembly having a second plurality of frustum reflectors that guide light from the light source to the second inner lens of the vehicle lamp; and an outer lens of the vehicle lamp, the outer lens spanning over the first and second inner lenses, the first and second inner lenses disposed between the first and second pluralities of frustum reflectors and the outer lens.

2. The vehicle lamp assembly of claim 1, wherein the vehicle lamp is a signal lamp.

3. The vehicle lamp assembly of claim 1, wherein the light source includes at least one first light that emits light through the first plurality of frustum reflectors, and at least one second light that emits light through the second plurality of frustum reflectors.

4. The vehicle lamp assembly of claim 1, wherein the first and second inner lenses are grained, and the outer lens is ungrained.

5. The vehicle lamp assembly of claim 1, wherein the light source comprises a plurality of light emitting diodes mounted to a circuit board.

6. The vehicle lamp assembly of claim 5, wherein no more than one light emitting diode is associated with each frustum reflector within the first and second pluralities of frustum reflectors.

7. The vehicle lamp assembly of claim 1, wherein the first and second pluralities of frustum reflectors are first and second pluralities a plurality of white frustum reflectors.

8. The vehicle lamp assembly of claim 1, wherein each of the first and second pluralities of frustum reflectors are polymer-based and are molded together.

9. The vehicle lamp assembly of claim 1, wherein each of the first and second pluralities of frustum reflectors are structurally continuous portions of a common body.

10. The vehicle lamp assembly of claim 1, wherein each of the first and second pluralities of frustum reflectors are formed as a single, continuous piece.

11. The vehicle lamp assembly of claim 1, wherein each of the first and second pluralities of frustum reflectors are provided in different regions of a monolithic structure.

12. The vehicle lamp assembly of claim 1, wherein each of the first and second pluralities of frustum reflectors comprises a plurality of frustum-shaped reflectors each having a reflective inner surface configured to direct light from the light source toward a respective outlet aperture.

13. The vehicle lamp assembly of claim 1, wherein the vehicle lamp is a vehicle lamp subassembly.

14. The vehicle lamp assembly of claim 1, wherein the first inner lens and the second inner lens are spaced a distance apart from each other such that there is a gap between the first inner lens and the second inner lens and no portion of the first inner lens interfaces directly with the second inner lens.

15. The vehicle lamp assembly of claim 1, wherein the first inner lens and the second inner lens each comprise a discrete lens body, wherein the first inner lens and the second inner lens are spaced apart from each other.

16. A vehicle lighting method, comprising:

emitting light from at least one first light into a first plurality of frustum reflectors;

reflecting light with the first plurality of frustum reflectors through a first inner lens of a vehicle lamp;

emitting light from at least one second light into a second plurality of frustum reflectors; and reflecting light with the second plurality of frustum reflectors through a second inner lens of the vehicle lamp, the second inner lens spaced apart from the first inner lens such that there is a gap between the first inner lens and the second inner lens.

17. The vehicle lighting method of claim 16, wherein the vehicle lamp is a signal lamp.

18. The vehicle lighting method of claim 16, further comprising emitting light from both the first and second inner lenses through an outer lens of a vehicle.

19. The vehicle lighting method of claim 16, wherein the first inner lens and the second inner lens each comprise a discrete lens body.

* * * * *